(12) United States Patent
Wang et al.

(10) Patent No.: US 9,274,627 B2
(45) Date of Patent: Mar. 1, 2016

(54) TOUCH PANEL AND ELECTRONIC DEVICE THEREOF

(71) Applicants: Wistron Corporation, New Taipei (TW); eTurboTouch Technology Inc., Taoyuan County (TW)

(72) Inventors: Kuei-Ching Wang, New Taipei (TW); Wen-Cheng Yu, New Taipei (TW)

(73) Assignees: Wistron Corporation, Hsichih, New Taipei (TW); eTurboTouch Technology Inc., Zhongli Dist., Taoyuan (TW)

( * ) Notice: Subject to any disclaimer, the term of this patent is extended or adjusted under 35 U.S.C. 154(b) by 145 days.

(21) Appl. No.: 13/902,990

(22) Filed: May 28, 2013

(65) Prior Publication Data
US 2014/0043261 A1    Feb. 13, 2014

(30) Foreign Application Priority Data

Aug. 13, 2012  (TW) .............................. 101129247 A

(51) Int. Cl.
G06F 3/041 (2006.01)
H01Q 1/24 (2006.01)
H01Q 1/22 (2006.01)
H01Q 1/38 (2006.01)
H01Q 1/40 (2006.01)

(52) U.S. Cl.
CPC .................. *G06F 3/041* (2013.01); *H01Q 1/22* (2013.01); *H01Q 1/243* (2013.01); *H01Q 1/38* (2013.01); *H01Q 1/40* (2013.01)

(58) Field of Classification Search
CPC combination set(s) only.
See application file for complete search history.

(56) References Cited

U.S. PATENT DOCUMENTS

| 8,427,820 B2 | 4/2013 | Kusuda | |
|---|---|---|---|
| 2011/0151937 A1* | 6/2011 | Kusuda et al. | 455/566 |
| 2014/0043261 A1* | 2/2014 | Wang et al. | 345/173 |

FOREIGN PATENT DOCUMENTS

| CN | 102124428 A | 7/2011 |
|---|---|---|
| CN | 202221808 U | 5/2012 |
| TW | M416105 U1 | 11/2011 |
| TW | M425335 | 3/2012 |

OTHER PUBLICATIONS

Office action mailed on Sep. 24, 2014 for the Taiwan application No. 101129247, filing date: Aug. 13, 2012, p. 1 line 11-14, p. 2-4 and p. 5 line 1-11 and line 15-17.
Office action mailed on Oct. 28, 2014 for the Taiwan application No. 101129247, filing date: Aug. 13, 2012, p. 1 line 1-4.
Office action mailed on Nov. 30, 2015 for the China application No. 201310196574.6, filing date: May 24, 2013, p. 3 line 6-28, p. 4 and p. 5 line 1-15.

* cited by examiner

*Primary Examiner* — Van Chow
(74) *Attorney, Agent, or Firm* — Winston Hsu; Scott Margo

(57) ABSTRACT

A touch panel includes a first plate, an antenna component and a decoration layer. A touch input area and a peripheral area aside to the input area are defined on the first plate. The antenna component is located at the peripheral area. The decoration layer is located at the peripheral area and hides the antenna component from view.

19 Claims, 9 Drawing Sheets

TOUCH PANEL AND ELECTRONIC DEVICE THEREOF

BACKGROUND OF THE INVENTION

1. Field of the Invention

The present invention relates to a panel and an electronic device, and more particularly, to a touch panel and an electronic device thereof.

2. Description of the Prior Art

Various types of touch input devices have been widely used in electronic products. For example, a mobile phone or a tablet PC utilizes a touch panel as an input device, and a user may easily touch on a surface of the input panel with hands to give commands, or slides on the surface of the touch panel to operate a cursor or perform handwriting input.

In general, touch panels are divided into resistive touch panels, capacitive touch panels, ultrasonic touch panels, infrared touch panels, etc. A traditional touch panel includes two plates, and sensing units, sensing wires, and an insulation layer formed on the plates. The plates are usually made of a transparent material, such as glass. The sensing units are utilized for sensing touch inputs of a user, and the sensing wires are connected with the sensing units to transfer input signals detected by the sensing units to a processing circuit. The sensing units are usually made by a transparent material. The sensing wires are located on a border of the plate and are usually made of a metal material.

The two plates are bonded in the border of each plate by utilizing a bonding material. Since the bounding material is generally a transparent material and a material of the sensing wires is a non-transparent material, the bounding material may not hide the insulation layer and the sensing wire. When the user views the touch panel from a side of the touch panel, the user may still view the insulation layer and the sensing wire. For solving the unsightly problem, the prior art is required to dispose an additional border in a cover, and when the touch panel is assembled in the cover, the border is utilized for hiding a part of the touch panel, which is not expected to be viewed (e.g. the insulation layer and the sensing wires). However, a disadvantage that the additional border on the cover of a product needs to be reserved is also caused. On the other hand, another conventional method is also provided to additionally form a non-transparent material above the insulation layer and the sensing wire to hide the insulation layer and the sensing wire, such that the insulation layer and the sensing wire are not visually exposed to an outside.

Additionally, if an electronic device assembled with the touch panel is required to provide a wireless functionality, such as wireless call or wireless data transmission, the electronic device must additionally configure components of a wireless processing circuit, and an antenna, etc. In order to have a better transceiving capability for an antenna, the antenna is usually hanged on an outside or attached in an inside of a mechanical component of the electronic device. However, with such a configuring method, the antenna may still be affected by the mechanical component to cause signal attenuation. Moreover, since the antenna is not effectively integrated in the electronic device, the electronic device provided for a general consumer to use is still having space to be further reduced in volume.

Thus, providing a touch panel and a related electronic device capable of integrating the antenna and avoiding the antenna to be visually exposed to an outside has become an important topic.

SUMMARY OF THE INVENTION

It is therefore an objective of the present invention to provide a touch panel and a related electronic device capable of integrating an antenna and avoiding the antenna to be virtually exposed to an outside.

For the above objectives, a touch panel according to the present invention comprises a first plate, an antenna component, and a decoration layer. The first plate defines a touch input area and a peripheral area, wherein the peripheral area is aside to the touch input area. The antenna component is located in the peripheral area. The decoration layer is located in the peripheral area, and hiding the antenna component from view.

According to an embodiment of the present invention, the touch panel further comprises a sensing unit and a sensing wire. The sensing unit is formed on the first plate and located in the touch input area. The sensing wire is formed on the first plate, located in the peripheral area, hidden by the decoration layer, and connected with the sensing unit.

According to an embodiment of the present invention, the touch panel further comprises an antenna signal wire, located in the peripheral area, hidden by the decoration layer, and connected with the antenna component. For example, the antenna signal wire is formed on the first plate and the antenna component is disposed on the first plate.

According to an embodiment of the present invention, the touch panel further comprises an antenna wire pin, formed on the first plate, located in the peripheral area, and connected with the antenna signal wire. For example, the antenna wire pin is hidden by the decoration layer, and directly connected to the antenna signal wire through a via of the first plate.

According to an embodiment of the present invention, the touch panel further comprises a sensing wire pin, formed on the first plate and located in the peripheral area, wherein the sensing wire pin and the antenna wire pin are connected to a same external wire. Additionally, the sensing wire pin and the antenna wire pin may also be respectively connected to two external wires.

According to an embodiment of the present invention, the antenna component is directly connected to an external wire through a via of the first plate.

According to an embodiment of the present invention, the touch panel further comprises a second plate, assembled with the first plate, wherein the antenna component and the decoration layer are located between the first plate and the second plate. For example, the above sensing unit, the sensing wire, or the antenna wire may also be located between the first plate and the second plate.

According to an embodiment of the present invention, conductive wires or circuits, such as circuits of a touch sensor or wires for connecting the touch sensor, are not disposed on the second plate. The second plate may be a simply protective material, and the circuits are only disposed on the first plate in the touch panel.

According to an embodiment of the present invention, the decoration layer is formed on an inner surface of the second plate. Additionally, the decoration layer may be formed the antenna component, and the antenna component is disposed on the first plate.

According to an embodiment of the present invention, the touch panel is a resistive touch panel or a capacitive touch panel.

According to an embodiment of the present invention, the touch panel further comprises an antenna wire pin, connected with the antenna component through a via of the first plate.

According to an embodiment of the present invention, the touch panel further comprises an antenna wire pin, wherein the antenna component is embedded in the peripheral area of the first plate and the antenna wire pin is coupled to an exposed side of the antenna component.

For the above objectives, an electronic device according to the present invention comprises an electronic module, a touch panel in the above description, and a radio-frequency module. The touch panel in the above description is assembled with the electronic module. The radio-frequency module is coupled to the antenna component of the touch panel.

In summary, in the touch panel and related electronic device of the present invention, since the antenna component is integrated in the touch panel, the electronic device may save the additional space for disposing the antenna and has a good transceiving quality of signals. Moreover, since the antenna is hidden by the decoration layer, the antenna is not visually exposed to an outside and the touch panel is more beautiful.

These and other objectives of the present invention will no doubt become obvious to those of ordinary skill in the art after reading the following detailed description of the preferred embodiment that is illustrated in the various figures and drawings.

DETAILED DESCRIPTION

According to related figures, a touch panel and a related electronic device according to a preferred embodiment of the present invention are described below, wherein the same components will be illustrated as the same reference numbers.

Figure 1A:
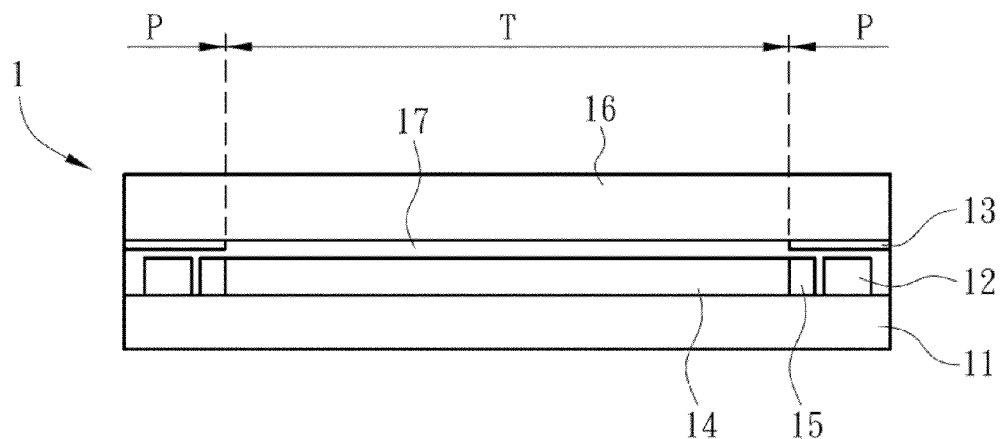
FIG. 1A-FIG. 1C illustrate side-view schematic diagrams of a touch panel according to preferred embodiments of the present invention.
Figure 1B:
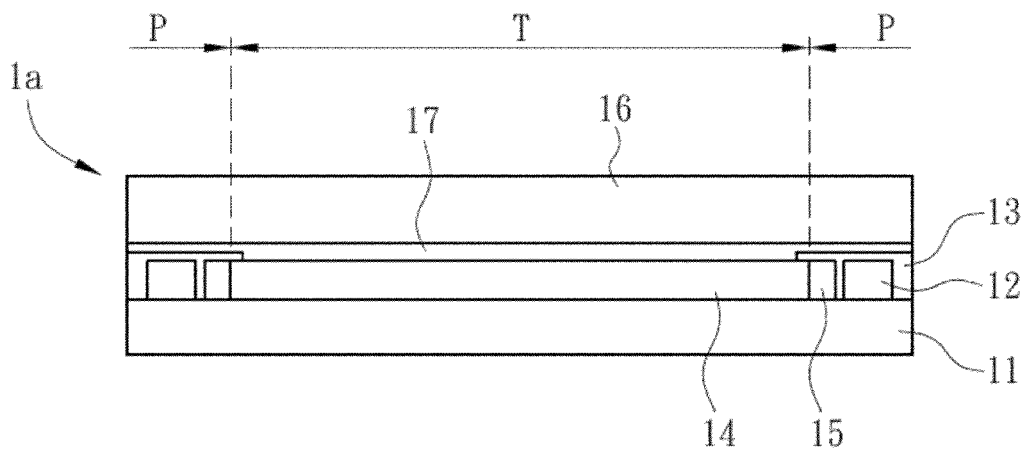
Figure 1C:
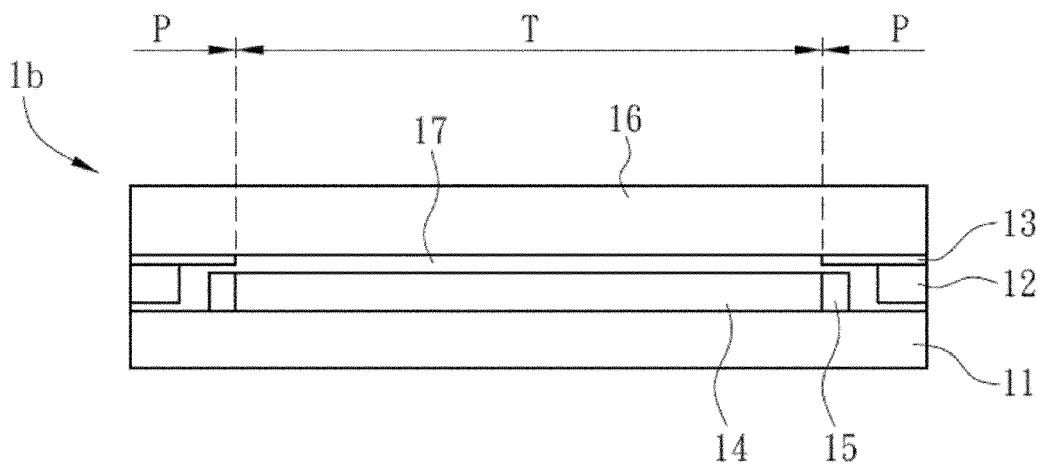

FIG. 1A-FIG. 1C illustrate side-view schematic diagrams of a touch panel 1 according to preferred embodiments of the present invention. As shown in FIG. 1A, the touch panel 1 includes a first plate 11, an antenna component 12, a decoration layer 13, a sensing unit 14, a sensing wire 15, and a second plate 16, wherein a material of the antenna component 12 includes silver, copper, nickel, titanium, or an alloy of the above materials.

The first plate 11 defines a touch input area T and a peripheral area P, wherein the peripheral area P is aside to the touch input area T. The antenna component 12 is located in the peripheral area P, and the decoration layer 13 is located in the peripheral area P to hide the antenna component 12 from view.

The sensing unit 14 is formed on the first plate 11 and located in the touch input area T. The sensing wire 15 is formed on the first plate 11, located in the peripheral area P, hidden by the decoration layer 13, and connected with the sensing unit 14.

The second plate 16 is assembled with the first plate 11, and the antenna component 12, the decoration layer 13, the sensing unit 14, and the sensing wire 15 are disposed between the first plate 11 and the second plate 16. For example, a bonding material 17 bonds the second plate 16 and the first plate 11, wherein the bonding material 17 may be an optical adhesive and directly or indirectly applied on the second plate 16 and the first plate 11.

For example, conductive wires or circuits, such as circuits of a touch sensor or wires for connecting the touch sensor, are not disposed on the second plate 16. The second plate 16 may be a simply protective material, which is typically a cover lens, and the first plate 11 is typically a transparent plate and has a material, such as glass or plastic. Since the circuits are only disposed on the first plate 11 in the touch panel, the touch panel may be regarded as a touch panel with a single plate.

The sensing unit 14 may define touch sensing wires by a pattern etching process, and has a material, such as indium tin oxide. The decoration layer 13 has a material, such as an insulating material. For example, the sensing unit 14 defines a plurality of wires as the touch sensing wires in the touch input area T of the first plate 11, and the touch sensing wires are not hidden by the decoration layer 13.

In FIG. 1A, the antenna component 12 is formed on the first plate 11, and the decoration layer 13 is formed on an inner surface of the second plate 16 to simultaneously hide the antenna component 12 and the sensing wire 15 from view. The decoration layer 13 is not formed on the first plate 11 and may be first formed on the inner surface of the second plate 16. After the antenna component 12, the sensing unit 14, and the sensing wire 15 are also disposed on an inner surface of the first plate 11, the bonding material 17 is utilized to bond the inner surface of the second plate 16 and the inner surface of the first plate 11.

In FIG. 1B, the decoration layer 13 is not formed on the second plate 16 and is formed on the antenna component 12 and the sensing wire 15. The antenna component 12 is disposed on the first plate 11. After the antenna component 12, the decoration layer 13, the sensing unit 14, and the sensing wire 15 are disposed on the inner surface of the first plate 11, the bonding material 17 is utilized to bond the inner surface of the second plate 16 and the inner surface of the first plate 11.

In FIG. 1C, the decoration layer 13 is formed on the inner surface of the second plate 16, and the antenna component 12 is disposed on the decoration layer 13. After the sensing unit 14 and the sensing wire 15 are disposed on the inner surface of the first plate 11, the bonding material 17 bonds the inner surface of the second plate 16 and the inner surface of the first plate 11.

In FIG. 1A-FIG. 1C, the second plate 16 is usually designed as an outside of the device, and the user operates the touch panel through the outside. Therefore, the decoration layer 13 hides the antenna component 12 and the sensing wire 15 from view, such that these components are not visually exposed to the outside to enhance the appearance. In addition, in FIG. 1A-FIG. 1B, components of an antenna signal wire, and a sensing wire pin, etc. are further disposed on the first plate 11, and related embodiments will be described below.

FIG. 2A-FIG. 2G illustrate top-view schematic diagrams of touch panels according to preferred embodiments of the present invention. As shown in FIG. 2A-FIG. 2G, for clearly illustrating components hidden by the decoration layer 13 in figures, the decoration layer 13 is only partially described in the cross section and the decoration layer 13 is intentionally not described in a right part of the touch panels 1c-1i.

In addition, the touch panels 1c-1i may only have one plate, i.e. no another plate is disposed above the decoration layer 13. Besides, the touch panels 1c-1i may also have two plates, i.e. another plate is disposed above the decoration layer 13. Whether another plate is disposed or not, another plate is also omitted in figures.

Figure 2A:
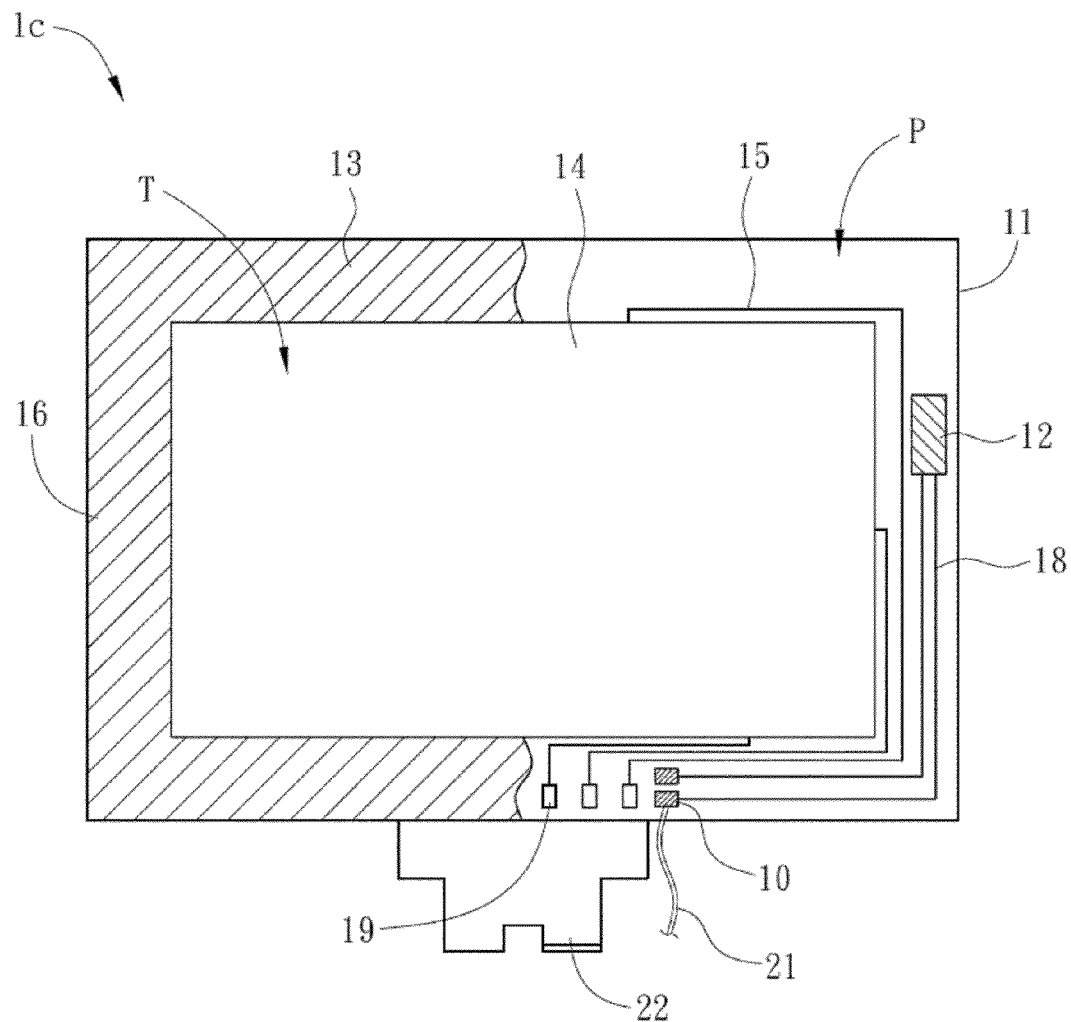
FIG. 2A-FIG. 2G illustrate top-view schematic diagrams of touch panels according to preferred embodiments of the present invention.
Figure 2B:
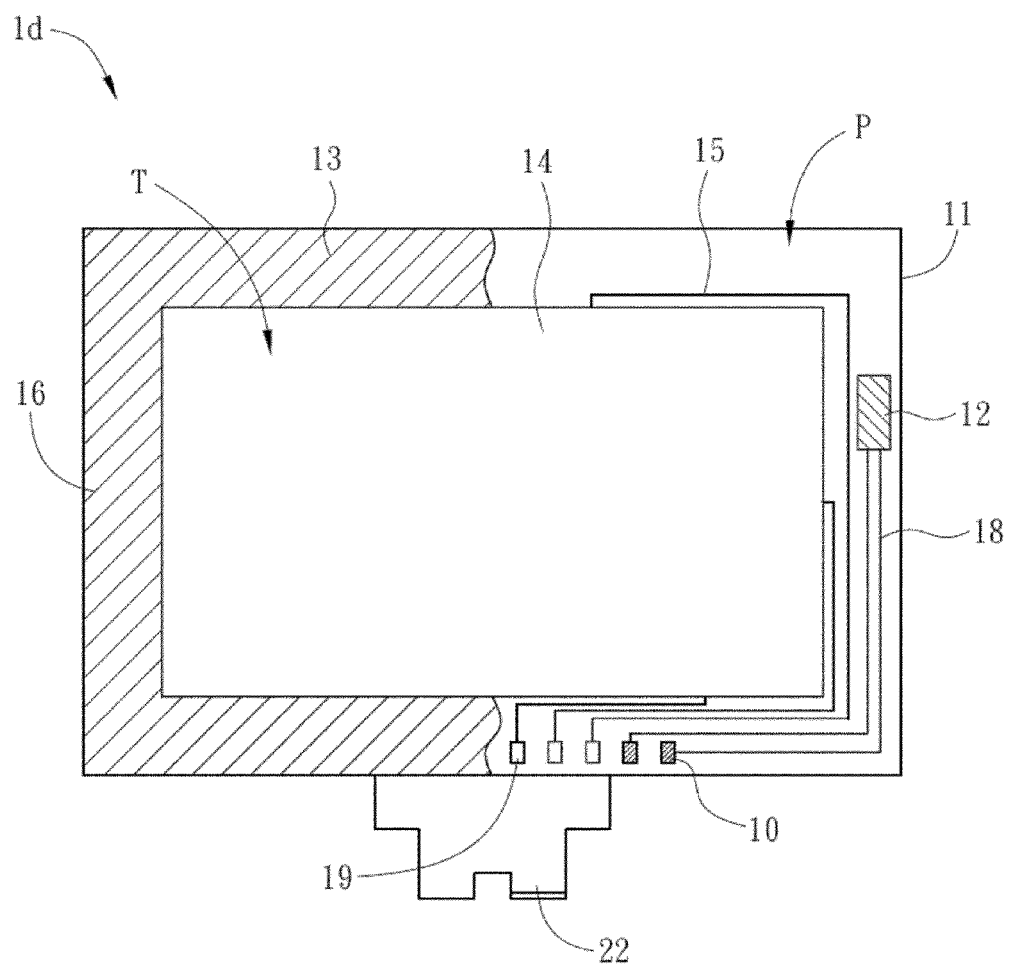
Figure 2C:
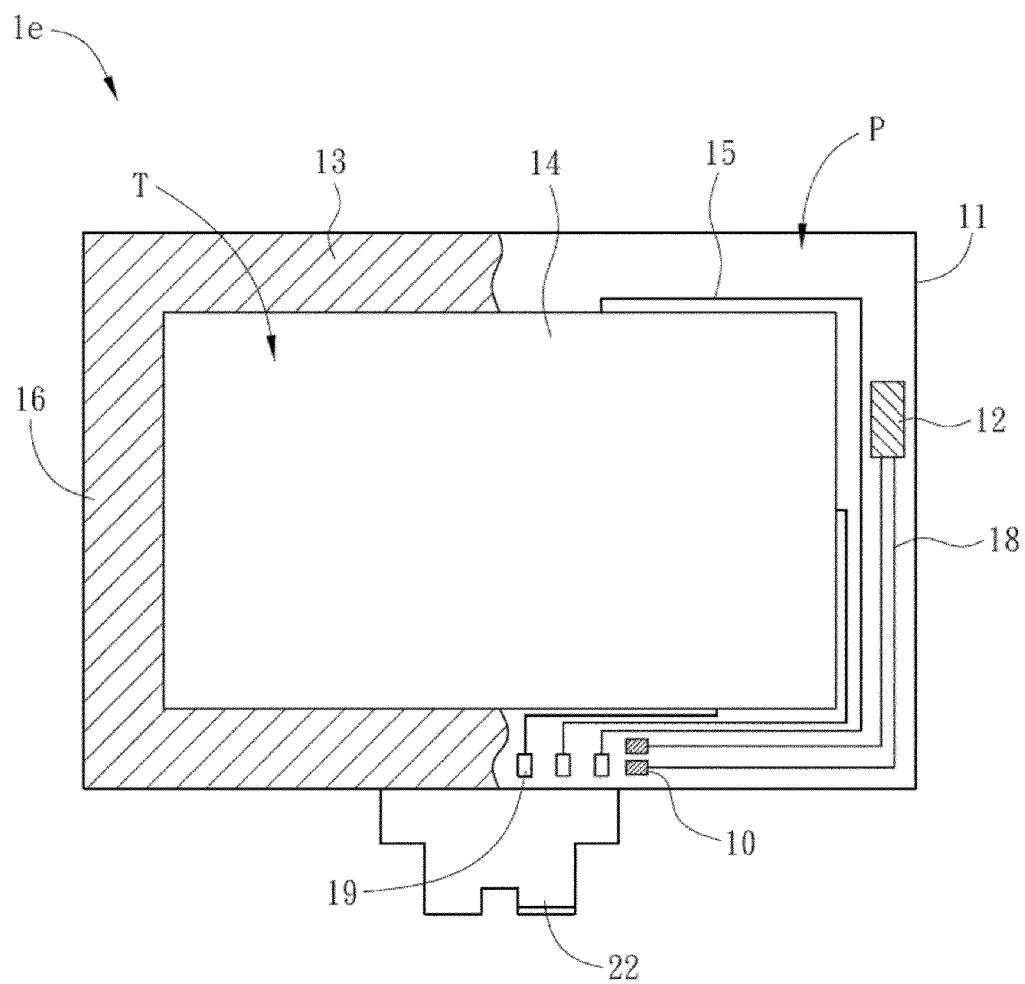

In FIG. 2A-FIG. 2C, the touch panels 1c-1e further include an antenna signal wire 18, an antenna wire pin 10, and a sensing wire pin 19. The sensing wire pin 19 is formed on the first plate 11, located in the peripheral area P, and connected with the sensing wire 15. The antenna signal wire 18 is located in the peripheral area P and hidden by the decoration layer 13. The antenna wire pin 10 is formed on the first plate 11, and located in the peripheral area P. The antenna signal wire 18 connects the antenna component 12 with the antenna wire pin 10. For example, the antenna signal wire 18 is formed on the first plate 11, and the antenna component 12 is disposed on the first plate 11.

The antenna component 12 has a signal feed-in terminal and a ground terminal, and the two antenna signal wires 18 are respectively connect the signal feed-in terminal and the ground terminal with the corresponding two antenna wire pins 10.

For example, the antenna wire pin 10 is hidden by the decoration layer 13 and is directly connected to the antenna signal wire 18 through a via of the first plate 11. The sensing wire pin 19 is hidden by the decoration layer 13 and is directly connected to the sensing wire 15 through a via of the first plate 11.

In FIG. 2A, the sensing wire pin 19 is connected to an external wire, such as a flexible printed circuit board (FPC) 22 via the external wire, and the antenna wire pin 10 is connected to another external wire 21.

In FIG. 2B, the sensing wire pin 19 and the antenna wire pin 10 are connected to a same external wire, such as connecting to a FPC.

In FIG. 2C, a pin of the antenna component 12 may be directly connected to the antenna wire pin 10.

Figure 2D:
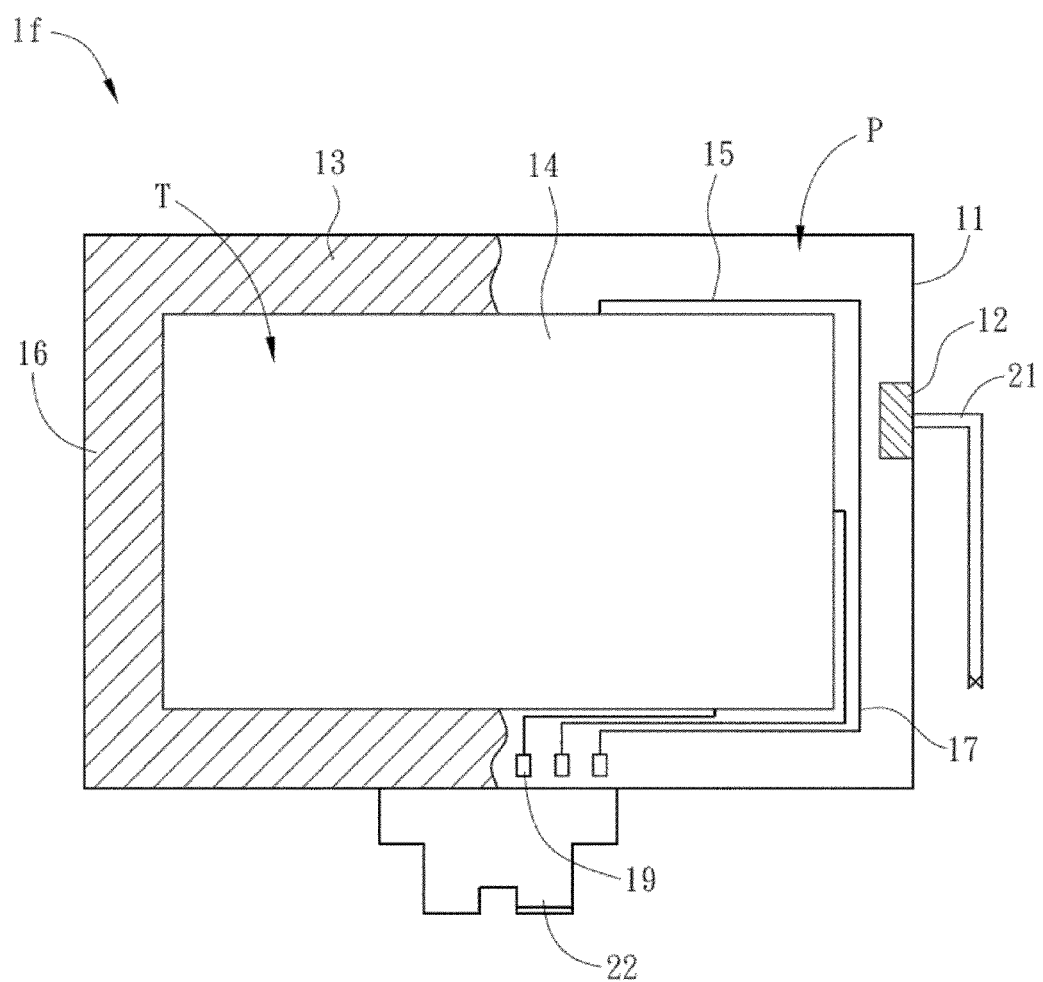

In FIG. 2D, the antenna component 12 is directly connected to an external wire 21 through a via of the first plate 11. Alternatively, the antenna component 12 is extended along a side edge of the first plate 11, and connected to the external wire 21 at the side edge of the first plate 11.

Figure 2E:
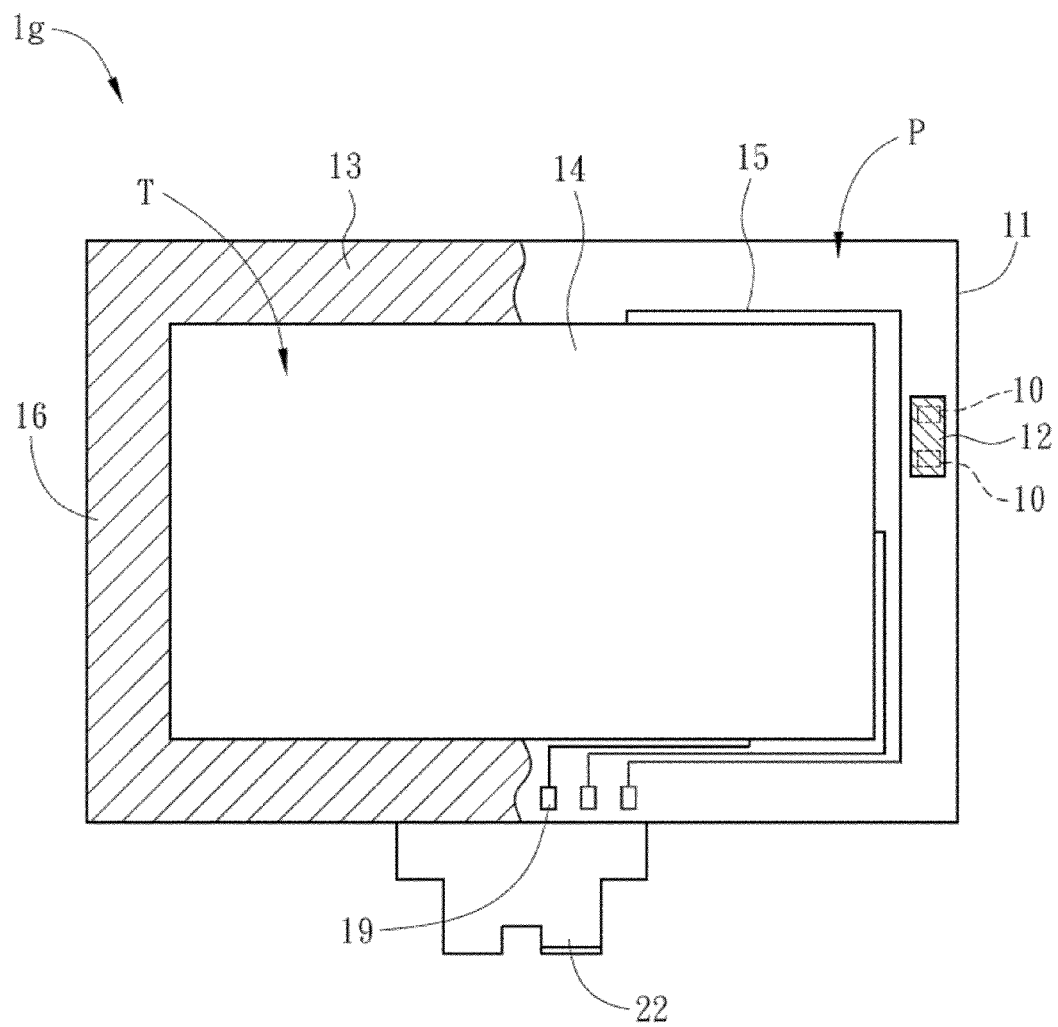
Figure 2F:
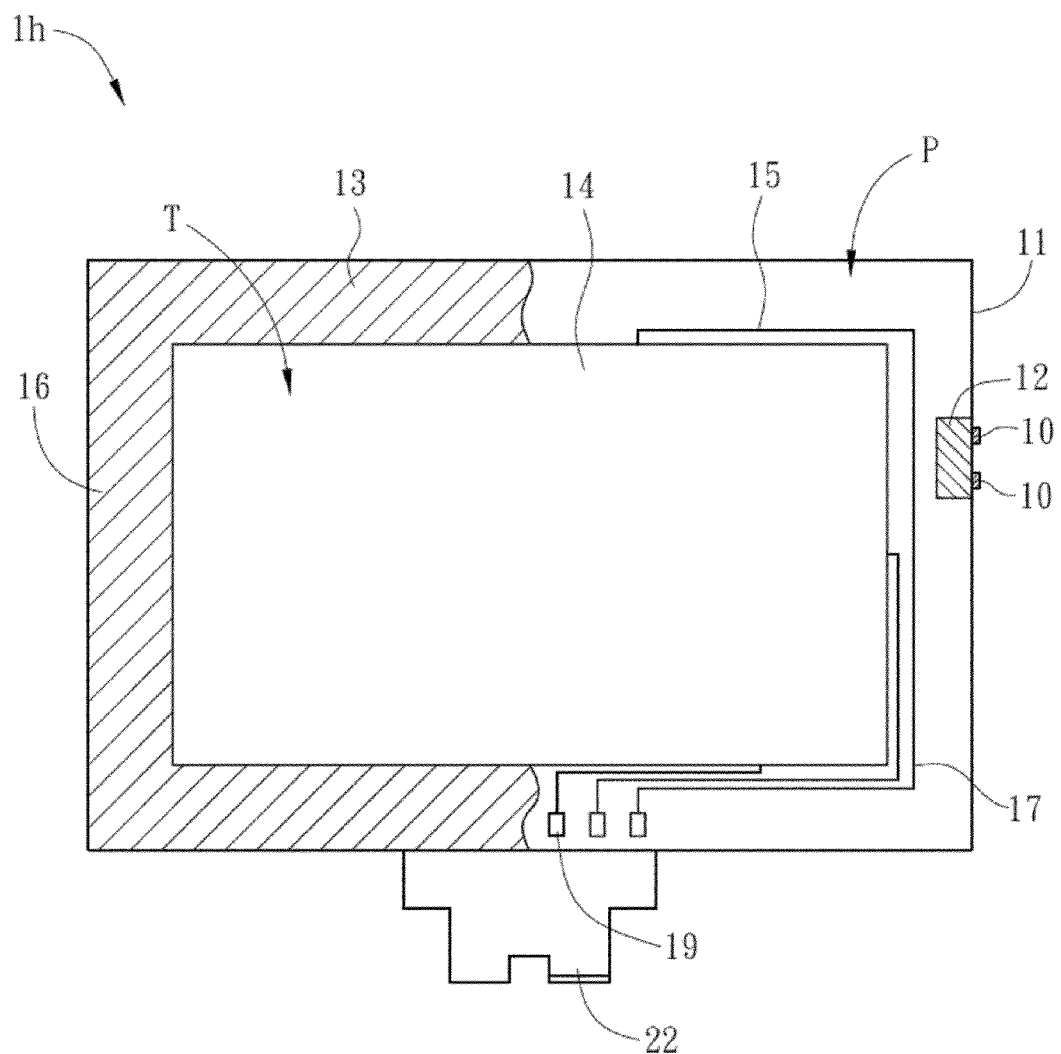
Figure 2G:
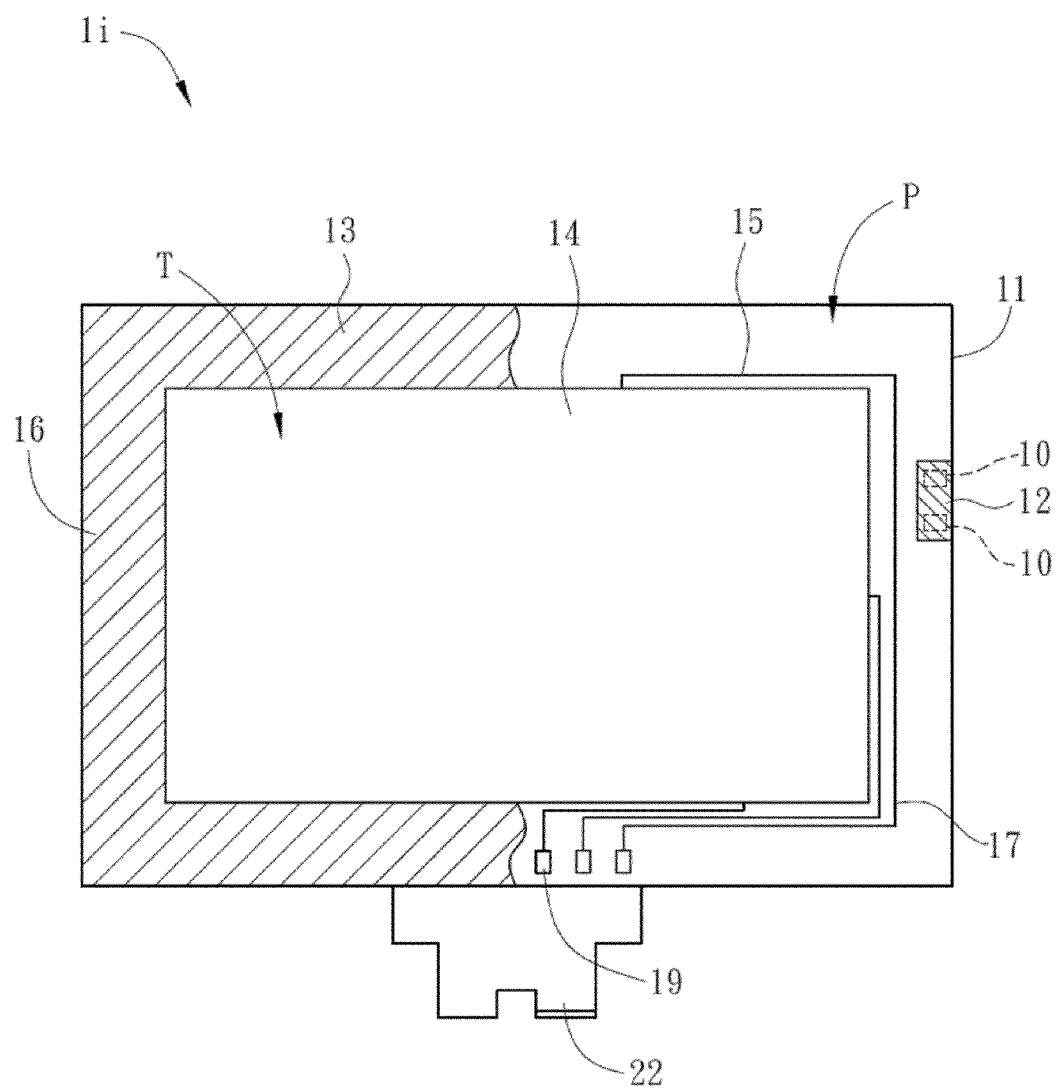

Please also refer to FIG. 2E-FIG. 2G, which illustrate embodiments of not using the antenna signal wire 18. As shown in FIG. 2E, the antenna component 12 is not connected with the antenna wire pin 10 via the antenna signal wire 18, and the antenna wire pin 10 is directly coupled to the antenna component 12 and a module, such as a radio-frequency module, through a via of the first plate 11.

As shown in FIG. 2F, since a side edge of the first plate 11 is hollow for embedding the antenna component 12, the antenna wire pin 10 may be directly coupled to the antenna component 12 and a module, such as a radio-frequency module, through the exposed right side edge of the antenna component 12.

As shown in FIG. 2G, of course, similar to the structure in FIG. 2F, the antenna wire pin 10 may also be directly coupled to the antenna component 12 and a module, such as a radio-frequency module, through a via of the first plate 11.

In the above description, the touch panels 1-1i are a resistive touch panel or a capacitive touch panel, such as a projected capacitive touch panel. In addition, an interval of at least 0.5 mm or more is provided between the antenna component 12 and the antenna signal wire 18, so as to avoid mutual interference. Furthermore, the antenna component 12 has a thickness of 10 um to 30 um, and may be disposed in an arbitrary position of the peripheral area P. The antenna component 12 is only required to consider whether the antenna component 12 may be hidden by the decoration layer 13, and others are not limited. Moreover, quantities of the antenna component 12 and corresponding contacts and wires are certainly not limited to one group, and may be two, three, or more groups according to requirements of the transmission of the signals.

Figure 3A:
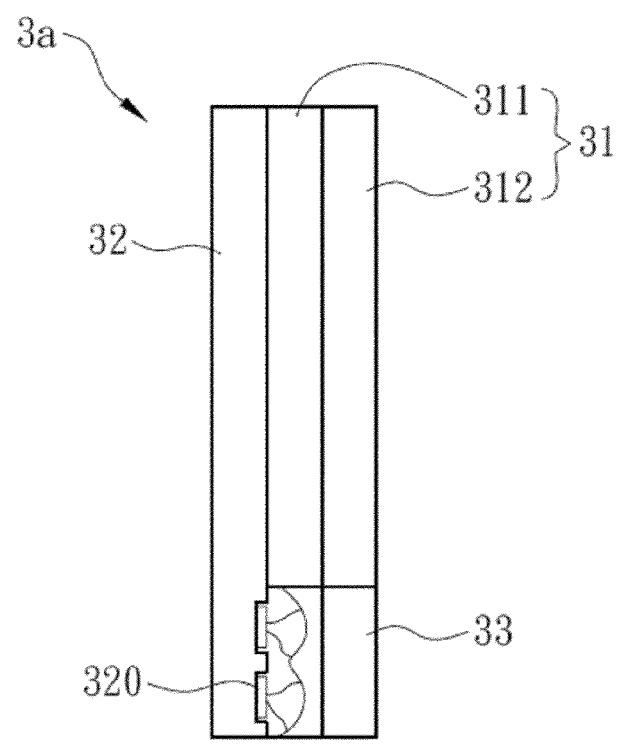
FIG. 3A-FIG. 3B illustrate side-view schematic diagrams of electronic devices assembled by touch panels according to preferred embodiments of the present invention.
Figure 3B:
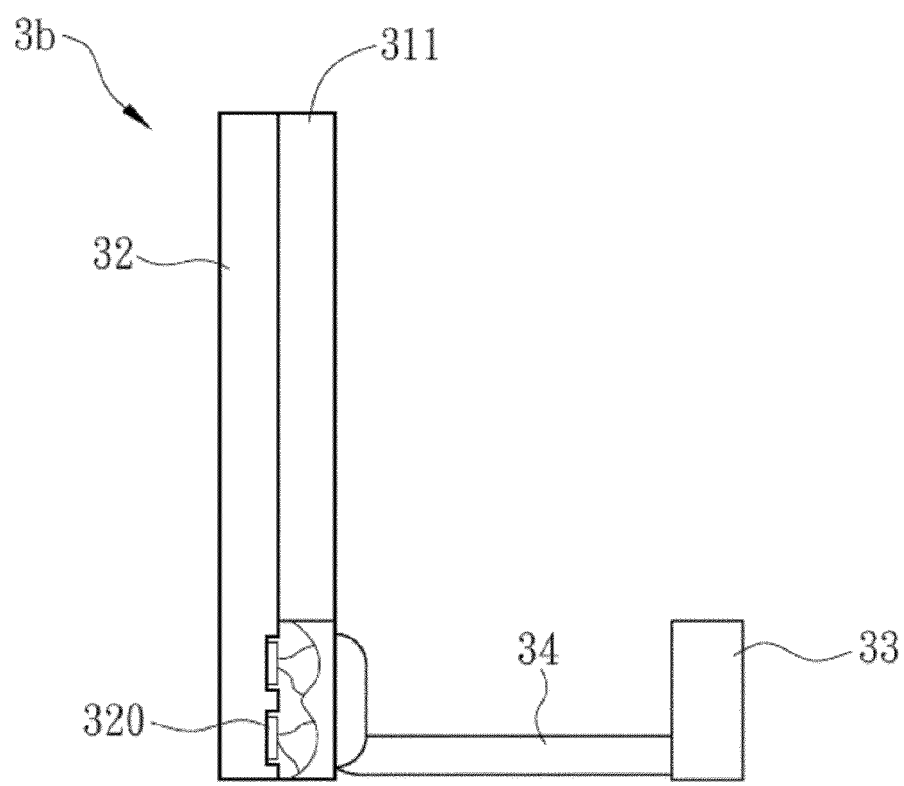

FIG. 3A-FIG. 3B illustrate side-view schematic diagrams of electronic devices assembled by touch panels according to preferred embodiments of the present invention. As shown in FIG. 3A and FIG. 3B, electronic devices 3a, 3b include an electronic module 31, a touch panel 32, and a radio-frequency module 33. The touch panel 32 is assembled with the electronic module 31, and the radio-frequency module 33 is coupled to an antenna component of the touch panel 32. The touch panel 32 may be the above touch panels 1-1i, and details of the touch panel 32 will not be narrated hereinafter.

The electronic module may be a display panel, a motherboard, or other electronic components with specific functionalities. The display panel is a panel, such as a liquid crystal display panel or an organic light emitting diode panel, etc. The motherboard is a circuit board with integrated circuits and placed wires, and may provide a particular operating or processing functionality. The integrated circuits may be processors or memories. The motherboard may further be equipped with a capacitor, or a resistor, etc.

In FIG. 3A, the electronic module 31 includes a display panel 311 and a circuit board 312. A displaying surface of the display panel 311 is toward the first plate of the touch panel 32, and the second plate of the touch panel 32 is located on an outside to be served as a cover. The radio-frequency module 33 may be disposed next to the circuit board 312, and is directly contacted with an antenna wire pin 320 of the antenna component in the touch panel 32. The antenna wire pin 320 may be connected with the antenna component on the first plate by the above antenna signal wire, or directly connected with the antenna component by a via of the first plate.

In FIG. 3B, the radio-frequency module 33 is connected with the antenna wire pin 320 of the touch panel 32 through a wire 34. Certainly, the antenna wire pin 320 may be directly connected with the antenna component by a via or an antenna signal wire, and is not limited herein.

Since the antenna component is integrated near an outer side of the touch panel, the volume of the electronic device may be reduced and the electronic device also has a good transceiving capability.

In summary, in the touch panel and related electronic device of the present invention, since the antenna component is integrated in the touch panel, the electronic device may save the additional space for disposing the antenna and has a good transceiving quality of signals. Moreover, since the antenna is hidden by the decoration layer, the antenna is not visually exposed to an outside and the appearance of the touch panel is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A touch panel, comprising:
a first plate, defining a touch input area and a peripheral area, wherein the peripheral area is aside to the touch input area;
an antenna component, located in the peripheral area;
a decoration layer, located in the peripheral area, and hiding the antenna component from view; and
an antenna signal wire, located in the peripheral area, hidden by the decoration layer, and directly connected with the antenna component.

2. The touch panel of claim 1, further comprising:
a second plate, assembled with the first plate, wherein the antenna component and the decoration layer are located between the first plate and the second plate.

3. The touch panel of claim 1, further comprising:
a sensing unit, formed on the first plate and located in the touch input area; and
a sensing wire, formed on the first plate, located in the peripheral area, hidden by the decoration layer, and connected with the sensing unit.

4. The touch panel of claim 1, wherein the antenna signal wire is formed on the first plate and the antenna component is disposed on the first plate.

5. The touch panel of claim 4, further comprising:
an antenna wire pin, formed on the first plate, located in the peripheral area, and connected with the antenna signal wire.

6. The touch panel of claim 5, wherein the antenna wire pin is hidden by the decoration layer, and directly connected to the antenna signal wire through a via of the first plate.

7. The touch panel of claim 5, further comprising:
a sensing wire pin, formed on the first plate and located in the peripheral area, wherein the sensing wire pin and the antenna wire pin are connected to a same external wire.

8. The touch panel of claim 5, further comprising:
a sensing wire pin, formed on the first plate and located in the peripheral area, wherein the sensing wire pin and the antenna wire pin are respectively connected to two external wires.

9. The touch panel of claim 1, further comprising:
an antenna wire pin, connected with the antenna component through a via of the first plate.

10. The touch panel of claim 1, further comprising:
an antenna wire pin, wherein the antenna component is embedded in the peripheral area of the first plate and the antenna wire pin is coupled to an exposed side of the antenna component.

11. An electronic device, comprising:
an electronic module;
a touch panel, assembled with the electronic module, comprising:
    a first plate, defining a touch input area and a peripheral area, wherein the peripheral area is aside to the touch input area;
    an antenna component, located in the peripheral area;
    a decoration layer, located in the peripheral area, and hiding the antenna component from view; and
    an antenna signal wire, located in the peripheral area, hidden by the decoration layer, and directly connected with the antenna component; and
a radio-frequency module, coupled to the antenna component of the touch panel.

12. The electronic device of claim 11, further comprising:
a second plate, assembled with the first plate, wherein the antenna component and the decoration layer are located between the first plate and the second plate, and the antenna component is directly connected to an external wire through a via of the first plate.

13. The electronic device of claim 11, further comprising:
a sensing unit, formed on the first plate and located in the touch input area; and
a sensing wire, formed on the first plate, located in the peripheral area, hidden by the decoration layer, and connected with the sensing unit.

14. The electronic device of claim 11, further comprising:
an antenna wire pin, formed on the first plate, located in the peripheral area, and connected with the antenna signal wire;
wherein the antenna signal wire is formed on the first plate and the antenna component is disposed on the first plate.

15. The electronic device of claim 14, wherein the antenna wire pin is hidden by the decoration layer, and directly connected to the antenna signal wire through a via of the first plate.

16. The electronic device of claim 14, further comprising:
a sensing wire pin, formed on the first plate and located in the peripheral area, wherein the sensing wire pin and the antenna wire pin are connected to a same external wire.

17. The electronic device of claim 14, further comprising:
a sensing wire pin, formed on the first plate and located in the peripheral area, wherein the sensing wire pin and the antenna wire pin are respectively connected to two external wires.

18. The electronic device of claim 11, further comprising:
an antenna wire pin, connected with the antenna component through a via of the first plate.

19. The electronic device of claim 11, further comprising:
an antenna wire pin, wherein the antenna component is embedded in the peripheral area of the first plate and the antenna wire pin is coupled to an exposed side of the antenna component.

* * * * *